Oct. 18, 1960 R. DEVILLERS 2,956,796
SUSPENSION SYSTEMS FOR MOTOR VEHICLES
Filed July 24, 1956 4 Sheets-Sheet 2

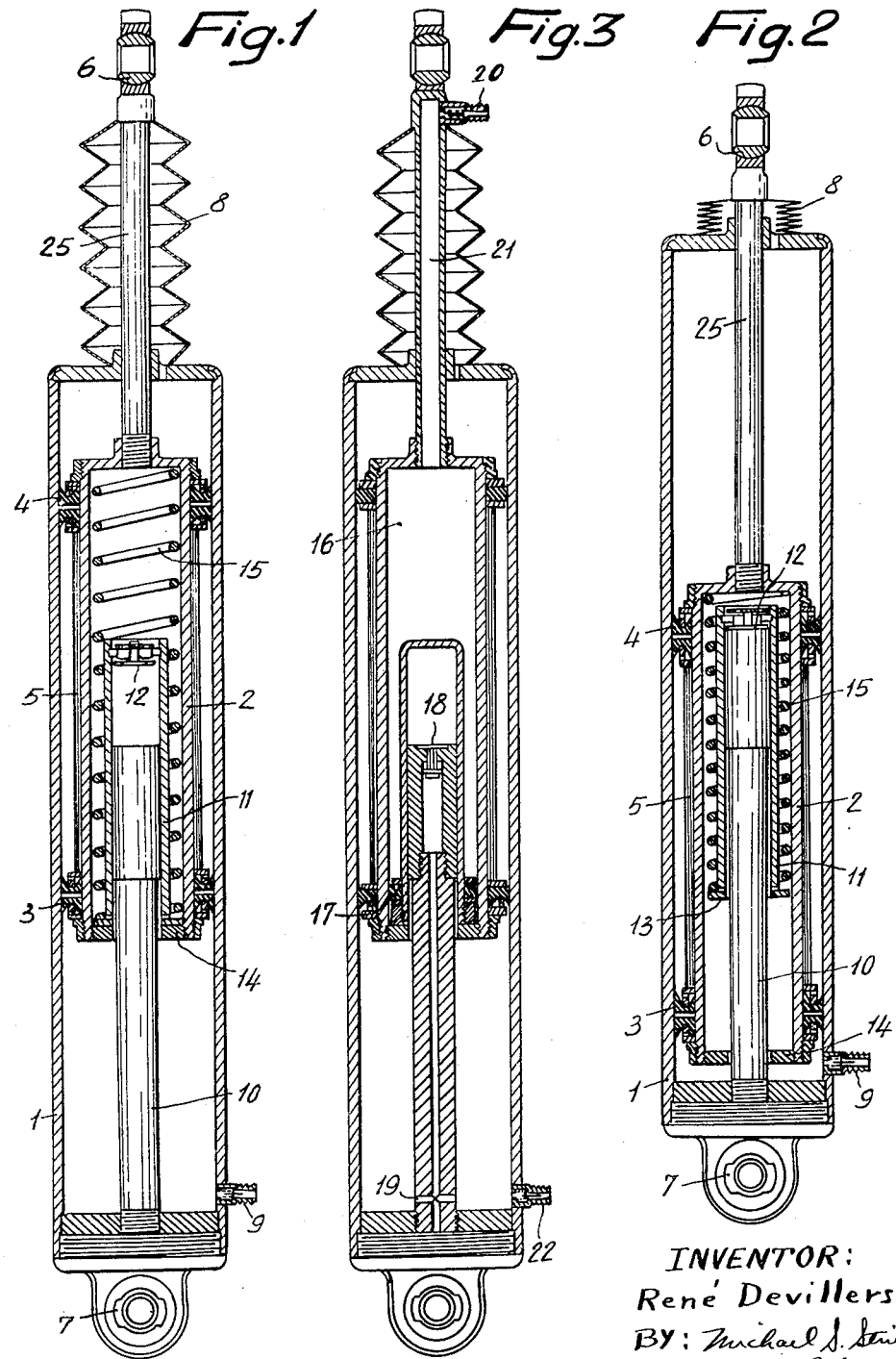

INVENTOR:
René Devillers
BY: Michael S. Striker
Agt.

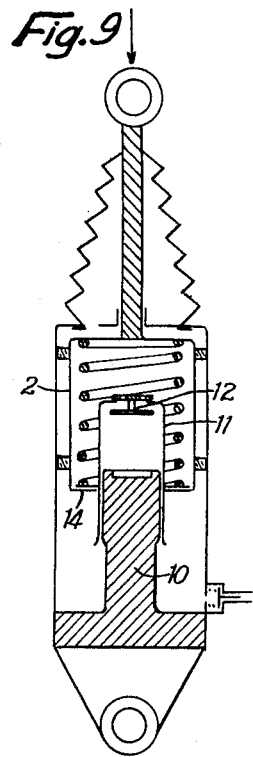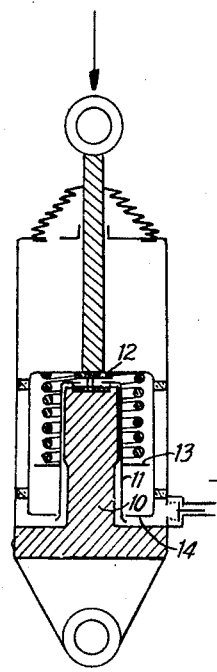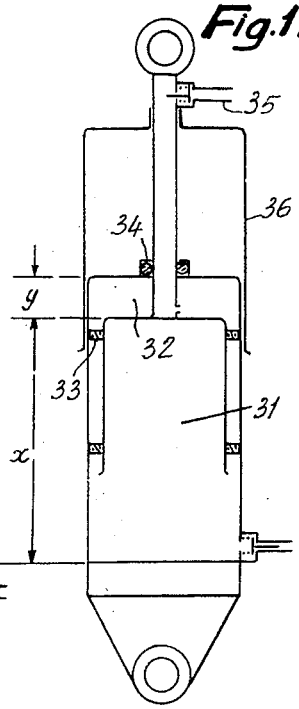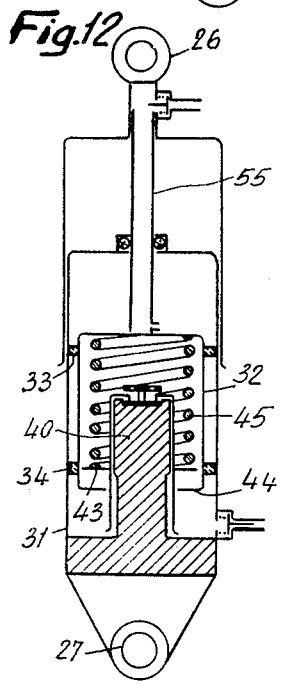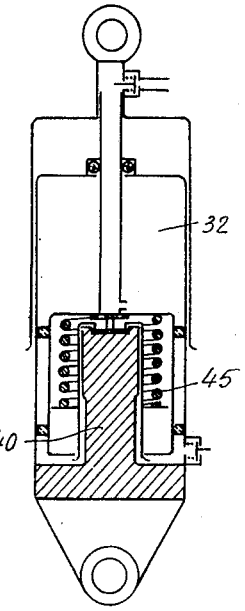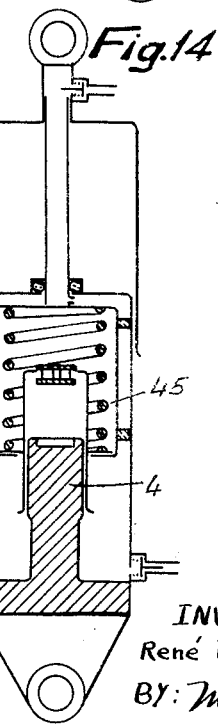

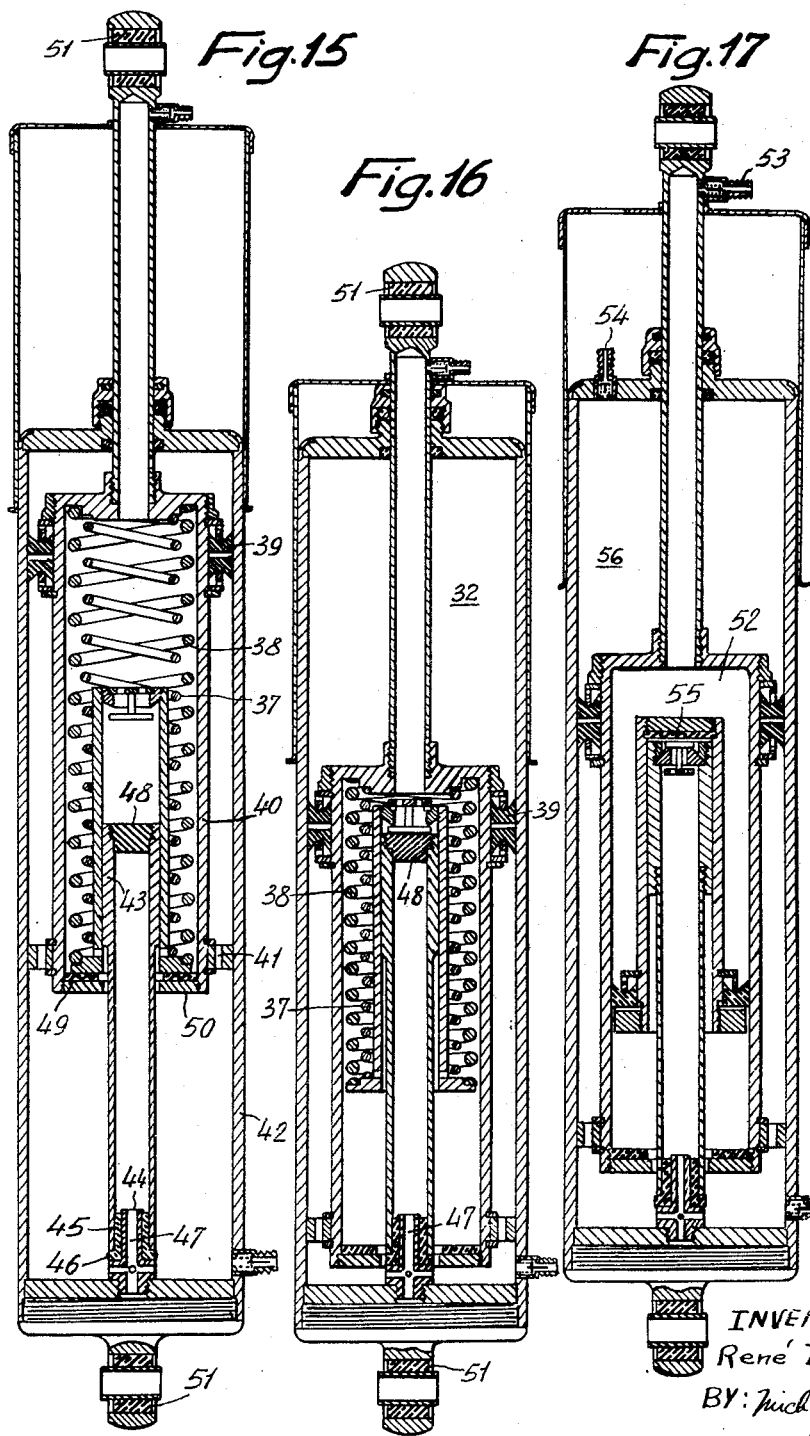

United States Patent Office 2,956,796
Patented Oct. 18, 1960

2,956,796

SUSPENSION SYSTEMS FOR MOTOR VEHICLES

René Devillers, 29 Rue des Sablons, Paris XVI, France

Filed July 24, 1956, Ser. No. 599,819

2 Claims. (Cl. 267—65)

In a conventional pneumatic suspension system for motor vehicles, the variable penetration due to the load counteracts uniform effectiveness and precision of damping, which are difficult to obtain owing to the preponderating effect of the compressibility of air.

This is why it is particularly difficult to damp the vibrations of non-suspended masses, at high frequency and low amplitude.

Many types of pneumatic suspensions for motor vehicles or the like have already been proposed in which the load is supported by a gas under pressure and in which a damping effect is obtained by passing a liquid or a gas through narrow slots or orifices formed between the two sides of a piston.

But those devices do not both compensate the suspended masses and wholly damp oscillations of any amplitude.

The present invention has as its object to solve the many difficulties of this problem by simple means.

It consists in combining, by mounting them in series between the two systems which are movable relative to one another, on the one hand an elastic suspension member for effecting compensation (a spring, gas under pressure or the like), precompressed to a value greater than the minimum load; and on the other hand a damping and suspension system comprising preferably at least two separate stages of damping by means of throttling a gas which is preferably under pressure.

In dynamic operation, the elastic reactions which are introduced for compensation act directly to control the damping processes, whose essential and fundamental features are thus inseparable from the very existence of the compensating system.

The two damping processes, which are of the same nature in that they both throttle gas but of different character in that the throttling is carried out in different ways, are generally successive but may overlap one another slightly. Each retains its integral effectiveness since it is possible to pass from one to the other before either is diminished. Their high efficiency is obtained by means of laminar flow by throttling without perceptible dead spaces and with a reduced initial volume. These factors avoid almost entirely the detrimental effect of compressibility. The term "dead space" is used to designate a space where the gas does not flow or moves only at a slow rate as compared to the main stream of gas.

All oscillations, even those of very low amplitude, are acted upon with equal effectiveness. However, although the two damping chambers have no dead spaces, in dynamic operation, by the combination of the elastic system and of the rapid compression of the air, direct metal-to-metal impact is impossible and likewise it is not possible for bumping to take place under the effect of an abnormal jolt. An advantageous differential effect is also obtained by the control due to compensation, with damping preponderating when the suspension relaxes. The resultant force of damping is due to laminar flows, thus remaining proportional to the viscosity of the air, to an efficiency due to the effect of compressibility and to the relative speed of displacement of the suspension.

This resultant force acts properly as a function of the displacements, since it is maximum in the mean position of the suspension and nil at the dead centers.

Preferably the suspension will also comprise means for correcting flexibility when the pressure of the compressed gas varies, more particularly when it expands during the operation of the apparatus. By "flexibility" there is understood the ratio between the elementary displacement in accordance with the effort produced and the corresponding variation of this effort.

With equal strokes, this effect is all the more marked in the case of a cylindrical suspension the shorter it is.

Therefore with a vehicle there is an excessive tendency to tilt at bends and to indulge in rolling and bucking movements which are insufficiently stabilized and of large amplitude.

To this end, there is added to the aforesaid damping and suspension chambers a supplementary compressed gas chamber which is arranged in such manner that its pressure is in opposition to the internal pressure of the suspension, said counter-pressure thus increasing in proportion as the suspension decompresses and vice versa.

The volume of this supplementary chamber and the arrangement of the chambers are preferably such that the sum of the supplementary and principal volumes is constant.

The pressures moreover are preferably such that the fixed ratio K between the absolute value of the counter-pressure and that of the main pressure, at the instant when these two volumes are equal, is comprised within the following limits:

$$0.1 < K < 0.3$$

the highest values giving the largest corrections.

In order to proceed to subject this supplementary chamber to pressure, it can simply be subjected at the time of assembly, to ambient pressure, in a position of the device corresponding to the maximum compression of the suspension; the expansion of the latter ensures compression of the compensating chamber.

It should be noted that this pneumatic compensation could be replaced by any spring or any combination of elastic members working in opposition to the principal pressure and making it possible to modify the law of flexibility in analogous conditions.

Finally, according to the invention and more particularly in the various examples of embodiments which will be described hereinafter, the chambers which contain a gas under pressure and provide the damping effects are so constructed as to have substantially no dead spaces at the end of stroke, which improves the comfort of the suspension system and also its cooling.

The invention also relates to certain other constructional details which will be brought out during the course of the description of the forms of embodiment given hereinafter, these being illustrated by way of example in the accompanying drawings, wherein:

Figures 1 and 2 are longitudinal sectional views, at the dead centers, of a telescopic spring-compensated pneumatic suspension according to the invention.

Figures 3 and 4 correspond to a similar suspension in the same positions, with compensation provided by a high-pressure air chamber.

Figures 9 and 10 show the extreme dynamic positions at the dead centers, Figure 10 showing the position at the bottom dead center.

Figure 11 shows schematically the principle of the counter-pressure on any cylindrical pneumatic suspension.

Figures 12, 13 and 14 show its application to the automatically damped suspension which is the subject of Figures 1 to 10, when a single compensating spring is used.

Figure 12 shows the static position, Figure 13 that of the bottom dead center and Figure 14 that of the top dead center, the suspension being expanded and the supplementary volume minimal.

Figures 15 and 16 show the use of two co-axial compensating springs in the two positions of top and bottom dead centers.

Figure 17 illustrates the application of counter-pressure to an automatically damped pneumatic suspension, of the springless type and thus having two air chambers, or to a pneumatic aircraft undercarriage based on exactly the same principles.

Figure 4:
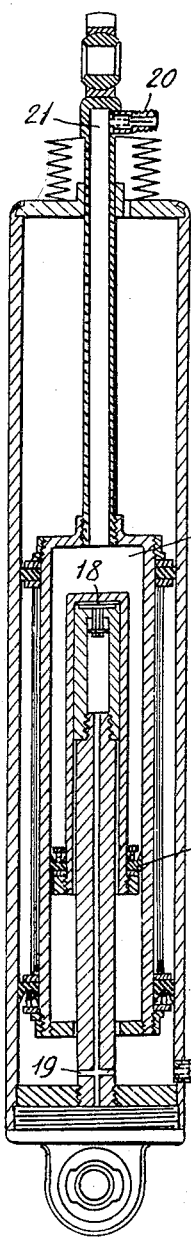

In the example of embodiment illustrated in Figures 1 and 2 and 7 to 10, the shock-absorber comprises two co-axial cylinders, the cylinder 2 which constitutes a first pneumatic means and is referred to hereinafter as the "first cylinder," and within which is situated a spring 15 forming a yieldable elastic means which ensures balanced suspension. The pneumatic means 2 is connected by a rod 25 and a connection 6 of any desired type to the chassis or the like. The other cylinder 1, which forms a second pneumatic means and is referred to hereinafter as the "second cylinder" is connected to the axle or the like by a connection 7. The connections 6 and 7 may be constituted by ball-and-socket joints or by rings lined with rubber. In this example the cylinder 1 is outside and the cylinder 2 is slidable within the cylinder 1 through the intermediary of lipped packings 3 and 4 which are, for example made of synthetic rubber, and are held by a spacer ring 5; the packings are generally greased and slide in contact with polished surfaces. It is possible to have only one packing 3, at the pressure side, the other packing 4 being replaced by a ring or segment holding the lubricant and participating in sound-damping. A bellows 8 made of leather or plastic material ensures a fluid-tight seal, opposing the introduction of any dust which may damage the joints, since the air must remain pure and dry.

A valve 9 enables the suspension to be inflated to a pressure which may be, on an average, 20 kg./cm.²

Carried on the bottom of the outer cylinder 1 and co-axial therewith is a plunger piston 10 capped by a socket member 11 within which the said plunger piston is movable with some radial clearance, of for example from 0.03 to 0.06 m./m. It is this clearance which allows the passage of air for producing one of the damping stages or processes. Thus, elements 10 and 11 co-operate to form a passage means providing a throttled gas passage for effecting damping. Where appropriate, it is also possible to construct a slightly conical piston so as to have a variable air passage.

The end of the socket member carries an automatic valve 12 opening towards the piston, with a very slight lifting distance which is limited by abutment means. This valve could also be arranged on the piston as indicated at 18 in Figures 3 and 4 without any change in the method of operation. The base of the socket member carries a shoulder 13 or base which is slidable with some slight radial clearance in the inner cylinder 2, which itself is closed at this point by a washer 14 which is movable on the piston with a similar amount of radial clearance and forms a second base. These lateral radial clearances, like that of the piston, are clearances for throttling air, and allow the second damping stage or process to occur. Parts 13 and 14 together with parts 10 and 11 thus form a two-stage passage means for throttling the flow of the gas. Because of the small width of the radial clearances of both stages, the gas flows therethrough in laminar fashion.

The compensating spring 15 which is co-axial with the inner cylinder 2 is mounted in the loaded condition between the top end wall of the said cylinder and the shoulder 13 of the socket member, to tend to keep shoulder 13 in contact with the washer 14 forming the second base. It is evident, therefore, that the yieldable elastic means 15 engages only the pneumatic means 2 and is not in engagement with the pneumatic means 1, while the passage means 10, 11 is connected only to the pneumatic means 1 and not to the pneumatic means 2, and the passage means 10 and 11 is connected also in series with the yieldable elastic means 15 through the shoulder 13, so that the yieldable elastic means 15 and the passage means 10, 11, which are in series with each other, are interposed between the pair of co-axial, telescopic pneumatic means 1 and 2. Moreover, it is clear that elements 10 and 11 form one group of members which provides a throttled gas passage in which the gas flows in laminar fashion and the elements 13 and 14 in cooperation with the cylinder 2 and the piston 10 form a second group of members providing a second throttled gas passage of laminar flow.

A device of this kind operates automatically, but if there is an external pressure source available, it can be supplied for example with the help of an adjustable pressure reducing valve.

In Figures 3 and 4 compensating is pneumatic, the spring being replaced by an air chamber 16 forming the yieldable elastic means of this embodiment and containing air under pressure greater than that of the second cylinder; for example 25 to 30 kg. for high pressure, to 20 kg. for mean pressure.

The shoulder of the socket member of Figs. 3 and 4 slides on the inner cylinder by means of a lipped packing 17, and it has been assumed that there is only a single packing between the two cylinders, with a ring at the upper portion. The valve 18 is then situated on the piston. When it is lifted, it causes the end of the socket member to communicate with the low pressure chamber through the orifices 19.

The high pressure chamber is inflated through a valve 20 situated at the end of the hollow rod 21, at the beginning of the bellows, while the low pressure chamber retains its valve at 22.

Figure 6:
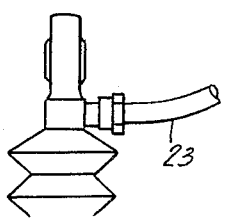
Figures 5 and 6 show one variant of this solution, with external application of pressure.
Figure 5:
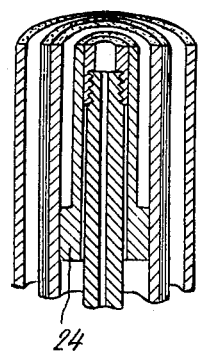

If an external pressure source is available, it is possible to feed only the high pressure through a tube 23 (Figure 6) connected to the housing of the valve 20 of Figure 3, and to dispense with the packing 17. The latter will be replaced by a carefully machined cylindrical surface 24 (Figure 5) leaving, however, space for a certain flow of air from the high to the low pressure chambers.

The valve for inflating the low pressure chamber will simply be replaced by a pressure relief valve.

The method of operation of this device will now be described with reference to the case where the elastic member is a spring (Figures 1 and 2; and Figures 7 to 10).

Figure 7:
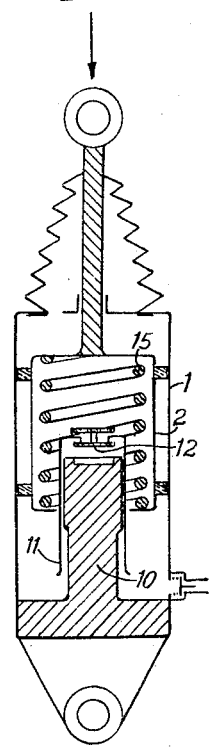
Figures 7 and 8 show by way of example, in the case of spring compensation, diagrams of the relative positions of the elements under reduced static load and full load, while, by way of comparison.

In the static condition the various members occupy the positions illustrated in Figures 7 (reduced load) and 8 (full load).

Owing to the throttling clearances, from the static point of view the pressures are everywhere in equilibrium, and therefore there is neither excess pressure nor a negative pressure in the socket member.

Since the spring 15 was initially pre-compressed to a value greater than the value necessary for supporting the reduced load, it only begins to yield when the load has been increased to a predetermined amount.

As long as the piston does not bear against the end of the socket member, the spring 15 works on itself without taking part in any way in the suspension (Figure 7) but as soon as contact is established, it can liberate its stored force progressively and absorb, without displacement, a corresponding variation in the load.

Figure 8:
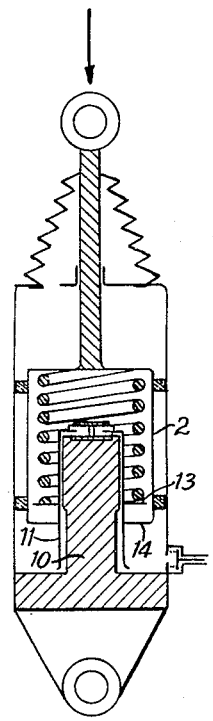

This liberation is complete when the shoulder 13 of the socket member ceases to bear against the base 14 of the inner cylinder (Figure 8).

The spring 15 then comes into action fully on the suspension, adding its effect to that of the compression of air and controlling the damping processes. This is the principle of compensation which allows arbitrary variation of the load carried without any sagging of the suspension.

Total compensation demands that the compression of the spring should correspond exactly to the variation in load, and it will generally be more advantageous to provide merely a partial compensation.

There will thus be defined, for a partial compensation suspension, two adjoining characteristic positions, one under low load (Figure 7) the piston 10 being a certain distance from the top end of the socket member 11, and the other under full load (Figure 8), the base 14 of the inner cylinder having moved downwards a certain distance from the shoulder 13 of the socket member 11. The sum of these two distances characterises the non-compensated load.

Figures 9 and 10 then show, relative to these two positions, the position of the dead centers in the case of considerable oscillations.

In Fig. 9, the base 13 of the socket 11 is shown in engagement with the base 14 of the cylinder 2, while in Fig. 10 the top end of the piston 10 is shown in engagement with the top end 12 of the socket 11. The contact of the parts shown in Figs. 9 and 10 takes place when the suspension is under static stress, and such contact will not take place during oscillation of the elements of this suspension while it is dynamically stressed.

The dynamic compression of air in the dead spaces in fact causes, before any contact takes place, yielding of the spring which then fulfils a very important damping function. These considerations apply wholly when the metal spring (Figs. 1 and 2) is replaced by compressed air, the precompression of the spring corresponding exactly to the excess pressure of the compensating air relative to the low pressure.

At reduced load, the top of the piston 10 being for example on an average 10 mm. from the top end of the socket member 11 (Figure 7), short oscillations are generally damped only by the movement of the piston in the socket member.

However, if the maximum pressure which it imparts to the air while compressing the same is sufficient to cause the spring to yield, the second damping process comes into action by the relative movement of the two bases 14 and 13 of the cylinder 2 and of the socket member 11, respectively.

In this case it is possible to obtain a preponderating effect upon expansion of the suspension, when the two bases approach one another owing to the restoring action of the spring 15.

In the case of long oscillations, the two damping processes follow one another and supplement one another. In compression of the suspension from its mean position, the piston 10 begins by compressing and throttling the air in the socket member 11 and then, without impact, causes the spring 15 to yield, moving the two bases 13 and 14 away from one another, as illustrated in Figure 10, whence the second process.

Then, in the expansion of the suspension, the return of the spring 15 brings the bases 13 and 14 back into contact without any shock and with an energetic damping effect, and then the piston 10 comes into action with lifting of the valve 12. At the return movement, the valve 12 is closed and the piston 10 has a damping effect, by compression and throttling, and then the process recommences. The damping may preponderate during the decompression stage when the bases approach one another.

For short oscillations, under full load, the top of the piston 10 remains in contact with the top end of the socket member 11, with a mean distance of 10 mm. for example, between the bases 14 and 13 of cylinder 2 and socket member 11 (Figure 8).

Damping the then effected laminar flow in the clearance space between piston 10 and socket 11 and throttling of part of the air situated between the said bases 13 and 14, with preponderance at the time of evacuation, due to the restoring effect of the spring 15, and thus at the time of decompression of the suspension.

In the case of large amplitudes the two methods of damping succeed one another.

In compression of the suspension from the mean position the two bases 13 and 14 move away from one another with aspiration of air and compression of the spring.

The reverse occurs at the return movement, with damping preponderating especially at reduced volume. Then the plunger piston 10 moves downwards in the socket member 11 and has a suction effect while opening the valve 12 (Figure 9) while at the return movement, it compresses the air and closes the valve.

Before the suspension returns to the mean positions again the piston 10 collapses the spring 15 without shock, moving the bases 13 and 14 away from one another, and the process recommences.

The examples which will now be described relate to cases where the suspension comprises a particular arrangement which is intended to correct variations in flexibility.

In Figure 11, the principal air chamber providing the suspension is 31, with a length $x$.

The supplementary air chamber is 32, of a length $y$, the sum $x+y$ remaining constant.

The chamber 31 is rendered fluid-tight by a packing 33 and the chamber 32 by a packing 34, for example of annular shape, with a stuffing-box for keeping out moisture and dust. A valve 35 makes it possible to keep the supplementary chamber under suitable pressure.

Without counter-pressure, flexibility would be substantially proportional to $x^2$, and thus would increase continuously when $x$ increased. Counter-pressure corrects this flexibility, which passes through a maximum in the vicinity of the mean position, and then decreases.

The second packing 34 protects the main packing 33, so that the bellows can be replaced by a sliding skirt member 36. The static position shown in Figure 12 corresponds to a load at which the bases 43, 44 are slightly spaced from one another. Owing to the spring 45, the static flexibility under the effect of a variation in load will, for example, be half as weak as under the influence of the pneumatic effect alone, and this limits variations in yielding.

In Figure 13 the suspension is compressed and therefore the supplementary chamber 32 is at maximum volume, and correction of flexibility is then at a minimum.

On the contrary, in Figure 14 the suspension is decompressed, the supplementary chamber 32 is at a minimum volume and correction of flexibility is then at a maximum.

Figures 15 and 16 give one example of embodiment dispensing with dead spaces and aiming at perfect sound deadening with, by way of example, two coaxial springs 37 and 38 of opposite pitch to one another instead of a single spring.

The principal chamber is sealed by a single lipped packing 39, the lower part of the cylinder 40 being guided by a perforated ring 41 so that the air between this cylinder and the outer cylinder 42 co-operates in the suspension and damping, promoting the evacuation of heat owing to its turbulence.

Likewise the plunger piston 43 can be hollow and mounted at the bottom on the spindle 44 which is screwed onto the plug with interposition of a sound-damping element 45 which at the same time forms an abutment with its shoulder 46, so that centering is not impeded without transmission of vibrations.

Orifices such as 47 allow communication between the inside of the piston 43 and the main chamber.

The piston is, for example, closed at the top by a plug 48 made of rubber or plastic material, which is screwed in position or vulcanised in the case of the rubber.

This prevents any perceptible noise occurring if the piston comes into contact with the end of the socket member, which may possibly take place, without any substantial shock in the case of very slow relative movements.

With the same object of sound-deadening, a rubber washer such as 49 may be stuck, for example by vulcanization, on to the inner surface of the base 50. Thus the two bases cannot contact directly in metal-to-metal fashion but only come into contact through the intermediary of this interposed washer. Finally, sound-deadening can be supplemented by arranging for the connections of the suspension to comprise sound-damping members such as 51, allowing the degree of elastic liberty necessary.

Figure 16 shows the position of the same suspension in the compressed condition, the supplementary space 32 being at the maximum, while it is at the minimum in the case of the compression corresponding to Figure 15.

This figure shows that the size of this minimum volume is controllable by the position in the vertical sense of the main lipped packing 39.

Figure 17, finally, illustrates the adaptation of the counter-pressure to pneumatic suspension without springs, the latter being replaced by the closed air chamber 52 which is under higher pressure than that of the main chamber. This chamber is placed under pressure through the valve 53, while the supplementary chamber 56 is subjected to pressure through the valve 54. The elastic plug at the top of the plunger piston is replaced by an elastic washer 55 at the end of the socket member.

Referring to Figs. 15 and 16 it will be seen that the cylinders 40 and 42 which are co-axial and which cooperate telescopically form a pair of pneumatic means adapted to be connected by the connections 51 to a chassis and wheel, respectively. The springs 37 and 38 form a yieldable elastic means engaging only the pneumatic means 40, while the piston 43 and the socket in which it slides form a passage means for providing a throttled flow of gas, this passage means being connected to the pneumatic means 42 and being in series with the yieldable elastic means 37, 38 through the abutment of the latter on the bottom shoulder of the socket. The radial clearance between this bottom shoulder and the inner surface of the cylinder 40 and the radial clearance between element 50 and the piston 43 form a second stage of a throttled gas passage means. The space within the pneumatic means 42 beneath the pneumatic means 40 forms the principal pressure chamber while the space within the pneumatic means 42 above the pneumatic means 40 forms the counter-pressure chamber corresponding to the chamber 32 of Figs. 11–13. It will be noted that all of the embodiments of the invention include such principal and counter-pressure chambers since in all embodiments the inner cylinder is housed completely in the outer cylinder so as to provide in the outer cylinder the principal pressure chamber beneath the inner cylinder and the counter-pressure chamber above the inner cylinder.

It will be apparent that with appropriate adaptation of pressures, with or without counter-pressure, this device lends itself in its entirety to the construction of a pneumatic aircraft undercarriage.

The counter-pressure improves stability however, when, with the undercarriage extended the aircraft is travelling along the ground, counteracting excessive flexibility and accentuating the decrease in elastic reaction in dependence on the expansion.

The second high-pressure chamber serves to absorb kinetic energy upon touching down.

The passage from moderate elastic reaction to maximum reaction is carried through gradually by compression of the landing gear.

This gradualness is ensured by means of the plunger piston which at the same time furnishes the damping effect at this phase of movement.

Upon expansion, the principal damping effect is produced by the bases, with pneumatic abutment due to the counter-pressure.

I claim:

1. A pneumatic telescopic suspension and shock damping device comprising, in combination, an outer cylinder; an inner cylinder located coaxially within said outer cylinder; means cooperating with said cylinders for providing a sliding fluid-tight movement of said cylinders with respect to each other; a piston extending coaxially along the interior of said outer cylinder, fixed to one end thereof, and extending into the interior of said inner cylinder; a socket located at least partly within said inner cylinder, said piston extending slidably into said socket and defining with the latter a radial clearance space which forms a throttled gas passage defining one damping stage; valve means carried by said socket at its end distant from said one end of said outer cylinder and providing a throttled flow of gas from the interior of said inner cylinder to the interior of said socket only when said valve means and said piston move one with respect to the other in a direction which increases the volume of the space between said valve means and piston; means connected to said socket and inner cylinder for defining a throttled gas passage of a second damping stage; and yieldable elastic means in said inner cylinder acting on said socket for urging the same toward said one end of said outer cylinder.

2. A pneumatic telescopic suspension and shock damping device comprising, in combination, an outer cylinder; an inner cylinder located coaxially within said outer cylinder; means cooperating with said cylinders for providing a sliding fluid-tight movement of said cylinders with respect to each other; a piston extending coaxially along the interior of said outer cylinder, fixed to one end thereof, and extending into the interior of said inner cylinder, said piston being formed with an elongated axial passage connected adjacent said one end of said outer cylinder with the interior of the latter; a socket located at least partly within said inner cylinder, said piston extending slidably into said socket and defining with the latter a radial clearance space which forms a throttled gas passage defining one damping stage; means connected to said socket and inner cylinder for defining a throttled gas passage of a second damping stage; valve means carried by said piston at its free end which is located within said socket and providing connection between the axial passage of said piston and the interior of said socket; and yieldable elastic means in said inner cylinder acting on said socket for urging the same toward said one end of said outer cylinder.

References Cited in the file of this patent

UNITED STATES PATENTS

| | | |
|---|---|---|
| 934,566 | Peck | Sept. 21, 1909 |
| 2,539,842 | Katz | Jan. 30, 1951 |
| 2,724,590 | Irwin | Nov. 22, 1955 |

FOREIGN PATENTS

| | | |
|---|---|---|
| 469,473 | Great Britain | July 23, 1937 |
| 129,981 | Sweden | Oct. 31, 1950 |